(12) United States Patent
Grenn et al.

(10) Patent No.: US 8,600,605 B2
(45) Date of Patent: Dec. 3, 2013

(54) DISTRIBUTED DIAGNOSTICS ARCHITECTURE

(75) Inventors: Daniel P. Grenn, Highland, MI (US); Marek L. Wilmanowicz, Pinckney, MI (US); Aniket Kothari, Southfield, MI (US); Leonard G. Wozniak, Ann Arbor, MI (US); Rick H. Schroeder, Lapeer, MI (US); Andrew M. Zettel, Ann Arbor, MI (US); Peter E. Wu, Brighton, MI (US); Wei D. Wang, Troy, MI (US); Michael J. Taljonick, Davison, MI (US); Jayanthi Padmanabhan, Troy, MI (US)

(73) Assignees: GM Global Technology Operations LLC; Electronic Data Systems Corporation, Plano, TX (US)

( * ) Notice: Subject to any disclaimer, the term of this patent is extended or adjusted under 35 U.S.C. 154(b) by 1968 days.

(21) Appl. No.: 11/531,545

(22) Filed: Sep. 13, 2006

(65) Prior Publication Data

US 2007/0179691 A1    Aug. 2, 2007

Related U.S. Application Data

(60) Provisional application No. 60/763,483, filed on Jan. 30, 2006.

(51) Int. Cl.
*G01M 17/00*    (2006.01)

(52) U.S. Cl.
USPC .......................................... 701/29.1; 701/29.6

(58) Field of Classification Search
USPC .............................................. 701/29, 33, 35
See application file for complete search history.

(56) References Cited

U.S. PATENT DOCUMENTS

| | | | | |
|---|---|---|---|---|
| 5,594,646 | A * | 1/1997 | Itoh et al. | 701/35 |
| 5,671,141 | A * | 9/1997 | Smith et al. | 701/29 |
| 5,974,351 | A * | 10/1999 | Croft et al. | 701/48 |
| 2001/0041956 | A1* | 11/2001 | Wong et al. | 701/36 |
| 2004/0080997 | A1* | 4/2004 | Okada et al. | 365/200 |
| 2005/0043868 | A1* | 2/2005 | Mitcham | 701/29 |
| 2005/0267655 | A1* | 12/2005 | Gessner | 701/29 |
| 2006/0052921 | A1* | 3/2006 | Bodin et al. | 701/33 |

* cited by examiner

*Primary Examiner* — Helal A Algahaim (57) ABSTRACT

A distributed on-board diagnostic (OBD) architecture for a control system of a vehicle includes a plurality of control modules that are in communication with one another and a designated master OBD control module that is one of the plurality of control modules. The master OBD control module performs functions that a remainder of the plurality of control modules are incapable of performing including at least one of arbitrating a malfunction indicator lamp (MIL) state, arbitrating and storing OBD freeze frame data and determining OBD status flags of the remainder of the plurality of control modules.

40 Claims, 2 Drawing Sheets

DISTRIBUTED DIAGNOSTICS ARCHITECTURE

CROSS-REFERENCE TO RELATED APPLICATIONS

This application claims the benefit of U.S. Provisional Application No. 60/763,483, filed on Jan. 30, 2006.

FIELD OF THE INVENTION

The present invention relates to vehicles, and more particularly to a distributed diagnostics architecture for a vehicle including multiple control modules.

BACKGROUND OF THE INVENTION

Traditionally, vehicles include multiple systems that regulate overall operation of the vehicle. For example, the vehicle includes a power plant (e.g., an internal combustion engine and/or an electric machine) that generates drive torque, an energy storage device (e.g., battery pack) that provides electrical energy, a transmission that distributes the drive torque to drive wheels and various other systems. Each of the systems includes an associated control modules or modules that communicate with one another to regulate operation of the vehicle.

Modern vehicles include an on-board diagnostic (OBD) system that provides almost complete engine control and also monitors the vehicle systems, as well as the diagnostic control network of the vehicle. The OBD system checks proper operation of the various control modules of the vehicle systems, as well as sensors (e.g., pre and post catalyst oxygen sensors) and other components. If there is a fault with any of the components, a malfunction indicator lamp (MIL) is illuminated and a diagnostic trouble code (DTC) is set. A vehicle technician or owner can readily determine the source of the fault by connecting a generic service tool to an OBD port located on the vehicle, which reads the DTC.

With the advent of more complex vehicle systems, such as hybrid electric vehicles, the number of inter-linked control modules increases. As a result, the coordination of the OBD required diagnostics of the individual control modules increases. Accordingly, OBD systems are tailored to the unique systems of a particular vehicle, which requires time, effort and cost per each vehicle platform. Presently, there is not a common OBD system approach that is readily adaptable to vehicle with varying system configurations.

SUMMARY OF THE INVENTION

Accordingly, the present invention provides a distributed on-board diagnostic (OBD) architecture for a control system of a vehicle. The distributed OBD architecture includes a plurality of control modules that are in communication with one another and a designated master OBD control module that is one of the plurality of control modules. The master OBD control module executes functions that a remainder of the plurality of control modules are incapable of executing including at least one of arbitrating a malfunction indicator lamp (MIL) state, arbitrating and storing OBD freeze frame data and determining OBD status flags of the remainder of the plurality of control modules.

In one feature, each of the plurality of control modules executes an OBD algorithm to monitor whether at least one of an input, an output and a system associated with a particular control module is functioning properly.

In other features, each of the plurality of control modules executes a self-diagnosis. The self-diagnosis includes at least one of a check of ROM, RAM, other memory devices and of all other emissions related peripheral devices within the particular control module.

In another feature, each of the plurality of control modules increment a rate-based diagnostic monitor if one is associated therewith.

In another feature, the distributed OBD architecture further includes a designated primary OBD control module that is one of the plurality of control modules. Each of the master OBD control module and the primary OBD control module store at least one diagnostic trouble code (DTC) corresponding to one of the remainder of the plurality of control modules that is associated with one of the master OBD control module and the primary OBD control module, as well as storing their own DTCs.

In another feature, the distributed OBD architecture further includes a designated primary OBD control module that is one of the plurality of control modules. Each of the master OBD control module and the primary OBD control module store at least one rate-based monitor value corresponding to one of the remainder of the plurality of control modules that is associated with one of the master OBD control module and the primary OBD control module, as well as storing their own rate-based monitor values.

In another feature, the distributed OBD architecture further includes a designated primary OBD control module that is one of the plurality of control modules. Each of the master OBD control module and the primary control module may gateway OBD signals between a first communications bus and a second communications bus.

In another feature, the distributed OBD architecture further includes a designated primary OBD control module that is one of the plurality of control modules. Each of the master OBD control module and the primary control module store and report calibration identification and calibration verification number information of at least one of the remainder of the plurality of control modules associated with one of the master OBD control module and the primary OBD control module.

In still another feature, the distributed OBD architecture further includes a designated primary OBD control module that is one of the plurality of control modules. The primary OBD control module provides the master OBD control module with signals including at least one of an emissions related DTC signal and an emissions related malfunction active signal.

In yet other features, the distributed OBD architecture further includes a designated primary OBD control module and a designated secondary control module of the plurality of control modules. The secondary control module provides associated rate-based monitor information to one of the master OBD control module and the primary OBD control module. The distributed OBD architecture further includes a designated dependent secondary OBD control module of the plurality of control modules that executes at least one of clearing diagnostic information based only on direction of one of the master OBD control module and the primary OBD control module, and providing calibration identification and calibration verification number information to an associated host control module.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the term standard on-board diagnostics (OBD) driving cycle refers to a driving cycle, during which diagnostics are performed on all systems of the vehicle.

Figure 1:
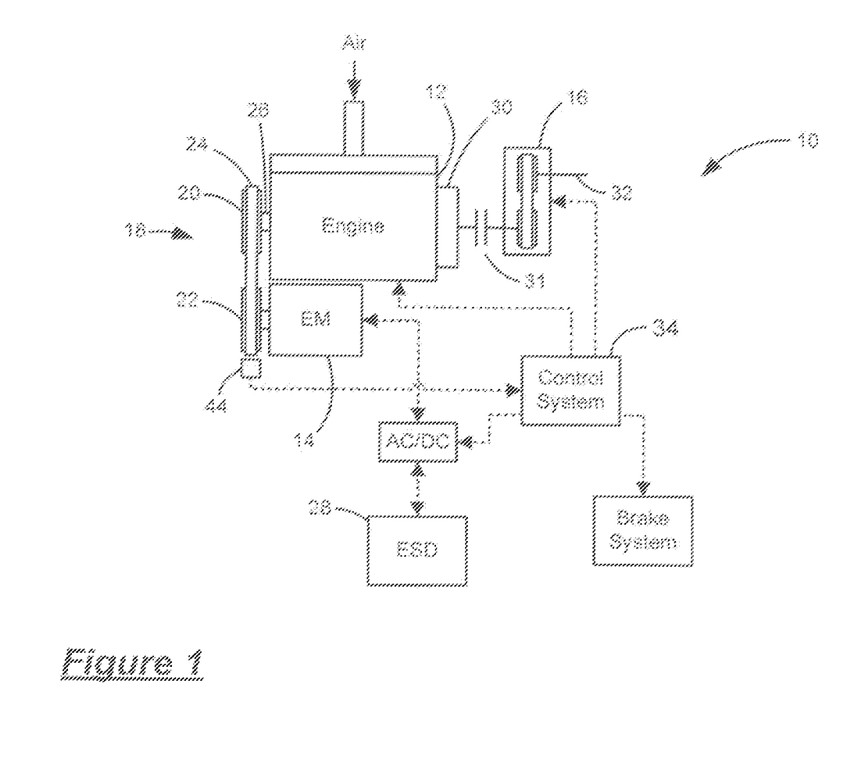
FIG. 1 is a functional block diagram of an exemplary vehicle system that includes a distributed diagnostics architecture in accordance with the present invention.

Referring now to FIG. 1, an exemplary hybrid vehicle 10 includes an engine 12 and an electric machine 14, which drive a transmission 16. More specifically, the electric machine 14 supplements the engine 12 to produce drive torque to drive the transmission 16. In this manner, fuel efficiency is increased and emissions are reduced. The engine 12 and electric machine 14 are coupled via a belt-alternator-starter (BAS) system 18. More specifically, the electric machine 14 operates as a starter (i.e., motor) and an alternator (i.e., generator) and is coupled to the engine 12 through a belt and pulley system. The engine 12 and the electric machine 14 include pulleys 20, 22, respectively, that are coupled for rotation by a belt 24. The pulley 20 is coupled for rotation with a crankshaft 26 of the engine 12.

In one mode the engine 12 drives the electric machine 14 to generate power used to recharge an energy storage device (ESD) 28. In another mode, the electric machine 14 drives the engine 12 using energy from the ESD 28. The ESD 28 can include, but is not limited to, a battery and/or a super-capacitor. Alternatively, the BAS system 18 can be replaced with a flywheel-alternator-starter (FAS) system (not shown), which includes an electric machine operably disposed between the engine and the transmission or a chain or gear system that is implemented between the electric machine 14 and the crankshaft 26.

Although the transmission is illustrated as a continuously variable transmission (CVT), the transmission 16 can include, but is not limited to, a CVT, a manual transmission, an automatic transmission and an automated manual transmission (AMT). Drive torque is transferred from the engine crankshaft 26 to the transmission 16 through a coupling device 30. The coupling device 30 can include, but is not limited to, a friction clutch or a torque converter depending upon the type of transmission implemented In the case of a CVT, the coupling device 30 is a torque converter including a torque converter clutch (TCC) 31. The transmission 16 multiplies the drive torque through one of a plurality of gear ratios to drive a driveshaft 32.

A control system 34 regulates operation of the vehicle 10 and is configured in accordance with the distributed diagnostic architecture of the present invention. More specifically, the control system 34 includes a plurality of control modules that are associated with various components of the vehicle 10 and that communicate via at least one controller area network (CAN) bus, as explained in further detail below. The control system 34 includes at least four control module on-board diagnostic (OBD) designations that include: a master OBD control module, a primary OBD control module, a secondary OBD control module and a dependent secondary OBD control module. More specifically, the control system 34 includes one master OBD control module, zero or more primary OBD control modules, zero or more secondary OBD control modules and zero or more dependent secondary OBD control modules. The responsibilities and/or requirements of each OBD control module type will be described in further detail below. In general, the control system 34 monitors components and systems, stores diagnostic trouble code (DTC) PASS/FAIL decisions, maintains in-use performance ratios, arbitrates a malfunction indicator lamp (ML), and responds to generic scan tool diagnostic test mode serial data requests.

Figure 2:
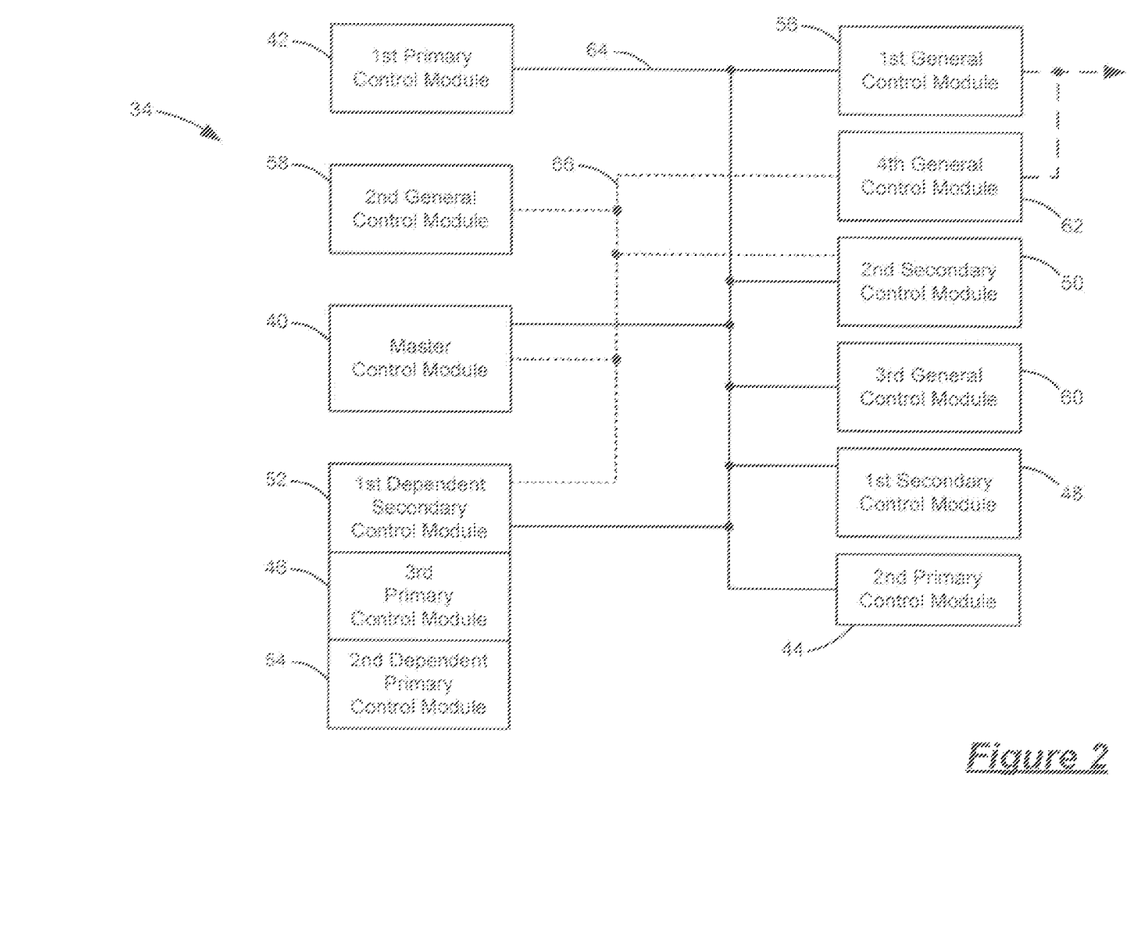
FIG. 2 is a functional block diagram of the distributed diagnostics architecture of the present invention including a plurality of exemplary control modules.

Referring now to FIG. 2, the exemplary control system 34 includes a master OBD control module 40, first, second and third primary OBD control modules 42, 44, 46, first and second secondary OBD control modules 48, 50, first and second dependent secondary OBD control modules 52, 54, and first through fourth general control modules 56, 58, 60, 62. Although the general control modules 56, 58, 60, 62 communicate with the other control modules to regulate operation of their respective systems, the general control modules 56, 58, 60, 62 are non-OBD control modules and are not required for proper operation of the distributed OBD architecture.

In an exemplary embodiment, the master OBD control module 40 is an engine control module (ECM) which regulates overall operation of the engine 12. The first, second and third primary OBD control modules 42, 44, 46 include a transmission control module (TCM), a fuel system control module (FSCM) and a hybrid control processor (HCP). The first and second secondary OBD control modules 48, 50 include a battery pack control modules (BPCM) and an electronic brake control module (EBCM). The first and second dependent secondary control modules 52, 54 include motor control processors A and B (MCPA, MCPB). A traction power inverter module (TPIM) includes the HCP, the MCPA and the MCPB. The first through fourth general control modules 56, 58, 60, 62 can include, but are not limited to, a body control module (BCM), a transfer case control module (TCCM), an electronic power steering (EPS) control module and a communication gateway module (CGM), respectively. The various modules communicate via first and second CAN buses 64, 66. Accordingly, the control modules are those that are normally associated with a particular system, but also include OBD functions based on the distributed diagnostics architecture of the present invention.

The responsibilities and/or requirements of the various OBD control modules of the control system 34 include, but are not limited to, the following, which are provided with respective identifiers A-Q;

A—diagnose associated components and systems
B—store own DTCs
C—arbitrate malfunction indicator lamp (MIL) state
D—provide fault status information to associated host control module
E—store DTC information from associated secondary and/or dependent secondary control modules
F—increment numerator and denominators for associated rate-based monitors
G—store numerators and denominators for any rate-based monitors that are reported
H—provide rate-based monitor status to associated host control module I—arbitrate and store the OBD required freeze frame
J—determine and provide OBD status flags to other control modules
K—gateway warm-up cycle standard condition, cold-start conditions and clear diagnostic information to dependent secondary control modules
L—clear diagnostic information based only on direction of master or primary control module
M—provide support for generic scan tool diagnostic test modes
N—provide calibration identification and calibration verification number information to associated host control module
O—store and report calibration identification and calibration verification number information for associated dependent secondary control modules
P—provide the master control module with the signals:
emissions related DTC; and
emissions related malfunction active
Q—include non-volatile memory (NVM) to store fault status and rate-based monitor status information to be reported at the next ignition cycle The following table illustrates which of the above-described responsibilities/requirements are associated with which control module based on the associated identifiers:

TABLE 1

| Control Module | Responsibility/Requirement |
| --- | --- |
| Master | A–C, E–G, I–K, M and O |
| Primary | A, B, E–G, K, M, O and P |
| Secondary | A, D, F, H, M and Q |
| Dependent Secondary | A, D, F, H, L, N and Q |

Each of the responsibilities and requirements will now be discussed in detail.

Responsibility/Requirement A,

Each control module includes diagnostic monitors each of which is an on-board diagnostic test that monitors the state of health of an input, an output, and/or a system. The diagnostic algorithm defines conditions, which are calibratable, during which the input, output and/or system is deemed faulty, as well as conditions when the input, output and/or system is considered as functioning properly. Each control module must diagnose itself, which includes, but is not limited to, a check of ROM, RAM and other primary memory devices. This self-diagnosis also includes a check of all other emissions related peripheral devices within the control module if it is determined that no other OBD required monitor will detect such faults in these control modules. Additionally, each control module must diagnose all inputs and outputs that can affect emissions during any reasonable in-use driving condition or that are used as part of the diagnostic strategy for any other diagnostic monitor. A control module may also be assigned to diagnose major systems and signals (e.g., catalyst monitor).

Responsibility/Requirement B:

A control module that stores its own DTCs contains the algorithms necessary to store the DTCs and to report them in a standardized format to a scan tool via a standardized diagnostic link. This requires resident diagnostic data management software, which is responsible for recording PASS and FAIL reports for each diagnostic monitor.

Responsibility/Requirement C:

The master OBD control module commands the MIL ON when either the master OBD control module itself has an active emissions-related DTC or when the master OBD control module receives an emissions related malfunction active signal with a value of TRUE from a primary OBD control module. The emissions related malfunction active signals include, but are not limited to, a hybrid system emissions related malfunction active signal, a transmission emissions related malfunction active signal and a fuel system emissions related malfunction active signal.

A MIL request command of higher priority takes precedence over the OBD command. Some examples of higher priority MIL commands include, but are not limited to the misfire diagnostic request to flash the MIL at 1 Hz due to catalyst damaging misfire, an ECM request for MIL illumination, and/or fuel pump prime logic requesting the MIL to flash. When the master OBD control module receives an emissions related malfunction active signal with the value of FALSE, the MIL is commanded OFF unless the MIL is being requested ON or is flashing for any other reason. The master OBD control module sends an engine emissions related malfunction indication request per the currently commanded MIL state.

The state (i.e., TRUE or FALSE) of the emissions related malfunction active signal has no effect on the state of the master OBD control module MIL status. The master OBD control module MIL status is a function of DTCs stored in the master OBD control module and is independent of a primary OBD control module generic fault DTC or a primary OBD control module emissions related malfunction active signal. The master OBD control module sends the engine emissions related malfunction active signal as an indication of when an engine emissions-related DTC is active.

Responsibility/Requirement D:

The secondary and dependent secondary OBD control modules send diagnostic status signals to its associated primary or master OBD control module per the signal description. These signals include, but are not limited to, the status of memory diagnostics (e.g., RAM, ROM, etc.).

Responsibility/Requirement E:

The master and primary OBD control modules store DTC information for the secondary and dependent secondary OBD control modules. The DTC information is stored per the signal description diagnostic status. The DTC information received is reported to the diagnostic data manager for storage in ignition independent or battery independent NVM.

Responsibility/Requirement F:

Each rate based diagnostic monitor is responsible for independently determining when to increment its numerator and denominator. The signals used by each monitor to influence the decisions to increment numerator and denominator include, but are not limited to legislated diagnostics cold start conditions fault present, legislated diagnostics cold start conditions met, legislated diagnostics standard conditions reset, legislated diagnostics standard conditions fault present, and legislated diagnostics standard conditions met.

Responsibility/Requirement G:

The master and primary OBD control modules store rate based monitor information for the secondary and dependent secondary OBD control modules. The rate based monitor numerators and denominators are updated per the signal description for the rate based monitor status.

Responsibility/Requirement H:

Each secondary and dependent secondary OBD control module with rate based monitors transmits the rate based monitor status per the signal description, provided in detail below.

Responsibility/Requirement I:

The master OBD control module receive the emissions related DTC and the emissions related malfunction active signals as the input to a generic fault DTC. The generic fault DTCs include, but are not limited to, a transmission control module (TCM) requested MIL illumination, a hybrid control processor (HCP) requested MIL illumination and a fuel system control module (FSCM) requested MIL illumination. The master OBD control module determines when to report a FAIL and/or a PASS for the particular generic fault DTC using the emissions related DTC and the emissions related malfunction active signals.

The criteria for the generic fault DTC monitor is based solely on the values of the emissions related DTC and the emissions related malfunction active signals. The failure criteria is the detection of a non-zero DTC within the emissions related DTC and a true value in the emissions related malfunction active. A failure for the generic fault DTC is reported once per ignition cycle, providing that the codes are not cleared. A PASS for the generic fault DTC is reported once per ignition cycle, provided that the codes are not cleared. A generic fault DTC fails and is stored whenever the value of the emissions related DTC or the emissions related malfunction active changes such that the emissions related DTC is non-zero and the emissions related malfunction active is TRUE. A pass is reported whenever the emissions related DTC is zero and the emissions related malfunction active is FALSE.

The master OBD control module uses the emissions related DTC signal to determine the value of the exact DTC to be stored in the freeze frame when the conditions are correct to capture it. The conditions for capturing a freeze frame (i.e., a picture of relevant data states when a DTC is activated) in the master OBD control module include, but are not limited to, the freeze frame being empty and a generic fault DTC being stored as a confirmed code. The generic fault DTC in the master OBD control module is calibrated as a Type A diagnostic with no light request so that the MIL is not commanded ON indirectly through the generic fault DTC.

Responsibility/Requirement J:

The master OBD control module is responsible for providing the following signals per the signal descriptions:
- engine warm-up cycle achieved signal, which is used by the primary OBD control modules to clear DTC history information from OBD memory after a specified number of warm-up cycles;
- diagnostics cold start conditions fault present signal, which is the alternative cue to inhibit incrementing rate based numerators for monitors that can only be executed when the vehicle experiences a cold start;
- diagnostics cold start conditions met signal, which is the alternative cue to increment rate based denominators for monitors that can only be executed when the vehicle experiences a cold start.
- diagnostics standard conditions fault present signal, which is a cue to inhibit incrementing rate based numerators, because the standard conditions will not be met due to a fault in the OBD system (this signal is not used in association with rate-based monitors that can only be executed when the vehicle experiences a cold start);
- diagnostics standard conditions met signal, which is a cue to increment rate based denominators (this signal is not used in association with rate-based monitors that can only be executed when the vehicle experiences a cold start);
- diagnostics standard conditions reset signal, which indicates an OBD drive cycle has begun; and
- clear diagnostic information signal, which is used by the primary OBD control modules to gateway this signal to dependent secondary OBD control modules, if necessary.

The above-identified signals, which are discussed in further detail below, are used by all OBD control modules for the purpose of maintaining the numerator and denominator of in-use ratios, commonly referred to as rate based monitors. It should also be noted that a standard OBD drive cycle begins and the previous cycle ends at the low to high transition of the run/crank hardwire. In control systems that do not have the run/crank hardwire as an input, the diagnostics standard conditions reset signal (e.g., low to high transition) is used to indicate the beginning of a standard OBD drive cycle.

Responsibility/Requirement K:

A control module may be required to gateway OBD system signals from the main OBD bus to a different communications bus. Conditions that drive gateway requirements are application specific and may include serial data architecture, OBD considerations, development requirements, and the like. When a control module is required to gateway OBD system signals, the control module transmits the last received values of a plurality of status indicators including, but not limited to, engine warm-up cycle achieved, legislated diagnostics cold start conditions fault present, legislated diagnostics cold start conditions met, legislated diagnostics standard conditions fault present, legislated diagnostics standard conditions met and clear legislated diagnostic information. These status indicators are transmitted from the main OBD bus to the required communication bus. When data is not received off the main OBD bus, the defined fail-soft data is transmitted on the gateway bus. Any communication link, through which these signals are gatewayed, must be diagnosed as a legislated diagnostic component by the control module (e.g., the master or primary) performing the gateway.

Responsibility/Requirement L:

A dependent secondary OBD control module does not support the clear/reset emissions related diagnostic information mode (i.e., mode $04) directly, but clears all fault information based on the clear legislated diagnostic information signal. Optionally, specific programs may gateway the clear legislated diagnostic information signal if the dependent secondary OBD control module is not on the main OBD bus and/or other program-specific needs. This includes, but is not limited to, all fault diagnostic counters and fault status in its memory. This signal has no effect on the rate based monitor numerators and denominators.

Responsibility/Requirement M:

Each of the master, primary and secondary OBD control modules are required to respond to the generic scan tool diagnostic test modes, as defined by the table below. A dependent secondary OBD control module does not respond directly to the scan tool Parameter identification codes (PIDs) must be supported if, and only if, used in the control or diagnosis of the emissions control system by any control module in the control system 34.

TABLE 2

| Mode Description | Master | Primary | Secondary | Dependent Secondary |
|---|---|---|---|---|
| $01 Request Current Powertrain Diagnostic Data | YES | YES | YES | |

TABLE 2-continued

| Mode | Description | Master | Primary | Secondary | Dependent Secondary |
|---|---|---|---|---|---|
| $02 | Request Powertrain Freeze Frame Data | YES | | | |
| $03 | Request all Emission Related Powertrain Trouble Codes | YES | YES | | |
| $04 | Clean/Reset All Emission Related Diagnostic Information | YES | YES | YES | |
| $05 | Request O2 Sensor Test ID Support (not supported) | | | | |
| $06 | Request On-Board Monitoring Test Results by Test ID | YES | YES | | |
| $07 | Request all Emission Related Powentrain Service Verification Codes | YES | YES | | |
| $08 | Request Control of On-board System, Test, or Component Test ID Support (not supported) | | | | |
| $08 | Request Control of On-board System, Test, or Component (not supported) | | | | |
| $09 | Info Type $00 - Vehicle Information Types ($01 to $20) which are supported | YES | YES | YES | |

Responsibility/Requirement N:

A dependent secondary OBD control module must send calibration identification and calibration verification number information to its associated host control module so that the host control module can meet diagnostic requirements. All software and calibration data stored in the dependent secondary OBD control module is covered by one or more calibration identification numbers (CIDs) and calibration verification numbers (CVNs). Each CID represents a region of ROM and can cover all or part of the control module's ROM, but will not overlap segments of ROM included in other CIDs. There are a sufficient number of CIDs to include all of the ROM. A dependent secondary OBD control module does not have more than a threshold number of CIDs (e.g., 16). The CIDs are preferably 16 digit ASCII strings, wherein the full 16 digit ASCII string is stored in ROM as a 16 digit ASCII string.

A CID is supported for each software control module part number and calibration control module part number. The values of the CIDs are equal to the software or calibration module part numbers represented in ASCII. The CIDs are stored within the control module and are separate from any manufacturing traceability part numbers. CID characters which are not used are stored and reported as $00. More specifically, the CID is left justified and is padded with $00.

Each CID includes a corresponding CVN that represents the checksum calculation for the region of memory identified by the CID. The CVN uses the industry standard CRC-16 method, which implements the polynomial $x^{16}+x^{15}+x^2+1$ to provide a 16 bit result. Byte 1 is the most significant byte of the CVN, however, if less than 4 bytes are used, the CVN is right justified and is padded with $00. This implies that byte 1 and byte 2 are padded with $00. Any un-programmed or unused portions of ROM, which are part of the region being check-summed, do not need to be included in the CVN calculation. The CVN calculation is executed once each ignition cycle provided that the ignition cycle is greater than a threshold time (e.g., 2 minutes). For CIDs representing calibration/software that is not reprogrammable, the corresponding CVN is set to zero or can be the result of a computation if desired.

A dependent secondary OBD control module uses its calibration identification information signal to transmit its CIDs and CVNs to its host controller.

Responsibility/Requirement O:

A host control module associated with a dependent secondary OBD control module stores and reports the CID and the CVN information for its dependent secondary OBD control module so that it meets vehicle information request (i.e., mode $09) diagnostic requirements. The host control module receives calibration identification information signals from its dependent secondary OBD control modules and provides either ignition independent or battery independent memory (e.g., 20 bytes) for storage of each received CID and CVN. The host control module also provides memory of the same type to store the storage status of each CID and CVN in order to distinguish between calibration identification indexes that are not used, have part numbers that have not been received, have CVNs that are uncalculated or have part numbers and CVNs that have been received and stored.

The host control module stores the last received CIDs and associated calculated CVNs and the receive status of each calibration identification index. If a new CID is received with a data status indicating that the CVN is not calculated, it is stored and marked as a CID with an uncalculated CVN until a calculated CVN is received. This data is reported with the host control module's own vehicle information request (i.e., mode $09) data when a vehicle information request response is provided. The calibration identification indexes that are not used are not included in the reported vehicle information request data.

Responsibility/Requirement P:

All primary OBD control modules transmit the emissions related DTC and the emissions related malfunction active signals to the master OBD control module in order to properly illuminate the MIL and record freeze frame data.

Responsibility/Requirement Q:

This responsibility refers to the secondary and dependent secondary OBD control modules that may or may not contain ignition independent or battery independent NVM for other purposes. In some cases, PASS/FAIL decisions for reported DTCs or increment rate based numerator/denominator decisions are only made after normal serial data communication has been terminated after key-off. In these cases, the effected secondary or dependent secondary OBD control module requires NVM to store DTC fault and/or rate based monitor status information and to report at the next ignition cycle (see Responsibility/Requirement D and H).

The various OBD signals that are implemented by the distributed diagnostics architecture of the present invention will now be discussed in detail. The master OBD control module determines when the standard OBD driving cycle begins based on the high to low transition of a crank/run relay (i e., engine start). The master OBD control module sets the diagnostics standard conditions reset (DSCR) signal to TRUE at the start of each standard OBD drive cycle for a threshold time (e.g., 1 second). In this manner, the start of the standard OBD drive cycle is synchronized between the various distributed OBD control modules. After the threshold time expires, the DSCR signal is switched to FALSE and the master OBD control module is ready to receive rate based monitor information from the other distributed OBD control modules. The master OBD control module ignores any information received when the DSR signal is TRUE.

For the rate based monitor status of a particular control module and/or system, in-use ratios consisting of numerators and denominators are maintained. The ratios are maintained by asynchronously incrementing the numerator and the denominator of a particular ratio. The numerators are incremented at the completion of the OBD monitor and the denominators are incremented based on standard drive conditions, which define a valid trip.

The secondary and dependent secondary OBD control modules transmit the rate based monitor status (RBMS) packet signal for a respective module and/or system to the master and/or primary OBD control modules. The RBMS packet signal reports the status of all rate based monitors running on the particular secondary and/or dependant secondary OBD control module by periodically cycling through each rate based monitor with each successive one in subsequent transmissions of the RBMS packet signal. For example if the particular secondary or dependant secondary OBD control module only actually supports a subset of the maximum number of rate based monitors (e.g. 32), then packets for all unsupported monitors are sent with a status indicating NO ACTION. After transmitting the last RBMS packet signal, the process starts over by sending a frame for the first rate based monitor. The primary purpose of the RBMS packet signal is to allow for rate based numerator and denominator maintenance within the master and/or primary OBD control modules without requiring the secondary and/or dependant secondary OBD control modules to bear the burden of rate based infrastructure software and NVM.

The reported rate based monitor index and associated status are incremented or updated at a periodic transmit rate, but are not incremented or updated faster than the periodic transmit rate so that no rate based monitor index value and associated status is lost. If consecutive RBMS packet signals received by the master and/or primary OBD control module are identical (e.g., the rate based monitor index and status are the same as the last received signal), the master and/or primary OBD control module ignores the second and any further consecutive identical messages. This generic mechanism enables the general interface mechanism to remain constant even if the secondary and/or dependent secondary OBD control module diagnostic requirements change.

As alluded to above, the RBMS packet signal includes the rate based monitor index (RBMI) and the rate based monitor status (RBMS). The RBMI is used as an index to a table of supported rate based monitors and indicates the particular monitor whose status is indicated by the RBMS. The RBMS includes the rate based numerator and denominator increment decisions for the monitor indicated by the RBMI.

At the beginning of each standard OBD drive cycle, the RBMS for each monitor is initialized to no action. The numerator is not incremented until enough time has passed such that a FAIL decision could have been made. For example, if the monitor determines that a respective test has passed, and the time required to arrive at this decision is less than the time required to arrive at a FAIL decision, then incrementing the numerator is not allowed until sufficient time has passed for the FAIL decision. The secondary and/or dependant secondary OBD control module does not increment the rate based monitor numerator white the diagnostics standard conditions fault present (DSCFP) signal is TRUE. The secondary and/or dependant secondary OBD control module does not increment a cold-start rate based monitor numerator while the diagnostics cold start conditions fault present (DCSCFP) signal is TRUE. Once an Increment Numerator status has been set, the only other valid status for the remainder of the standard OBD drive cycle is Increment Both. The status does not revert to NO ACTION, nor can it be set to Increment Denominator. If the conditions to set the Increment Numerator and Increment Denominator status are met concurrently, then the status is set to Increment Both.

The secondary and/or dependant secondary OBD control module is allowed to increment the rate-based monitor denominator when it has received a diagnostics standard conditions met (DSCM) signal with a value of TRUE. The secondary and/or dependant secondary OBD control module is allowed to increment the cold-start rate based monitor denominator when it has received a diagnostics cold start conditions met (DCSCM) signal with a value of TRUE. A rate based monitor does not increment the denominator if it is disabled by an emissions related DTC.

The decisions to increment the numerator and denominator are asynchronous, based on distinctly different conditions. The sequence of events will vary with every standard OBD drive cycle. Accordingly, a rate-based monitor is expected to progress through the possible status values from no action to either Increment Numerator or Increment Denominator to Increment Both.

As discussed above, the associated master or primary OBD control module receives the RBMS packet signals which is used by the receiving control module to increment rate based numerators and denominators for rate based monitors associated with the transmitting secondary and/or dependant secondary OBD control module. The master and/or primary OBD control module implements a rate based utility function to enable proper incrementing and storage of rate base numerators and denominators, and ensures that rate based numerators and denominators are incremented and stored no more than once per standard OBD drive cycle. The receiving control module ignores the RBMS packet signal for a threshold time (e.g., 5 seconds) at the beginning of each standard OBD drive cycle. In this manner, multiple numerator and/or denominator increments within a single standard OBD drive cycle is prevented. The primary purpose of the RBMS packet signal is to enable in-use ratio storage within the master and/or primary OBD control module so that the secondary and/or dependant secondary OBD control module does not require rate based infrastructure, software and NVM.

The master and/or primary OBD control module transmits the clear diagnostic information (CDI) signal, which is initialized to FALSE when the master and/or primary OBD control module is powered up. The CDI signal is only set to TRUE when the master and/or primary OBD control module receives a properly formatted diagnostic code clear (DCC) command, which is generated via a clear/reset all emission related diagnostic information (i.e., mode $04) command from the generic scan tool. When the CDI signal is set to TRUE, it remains TRUE for the period of time that the master and/or primary OBD control module is not storing fault codes reported to it from any other OBD control module, then transitions to FALSE. It is anticipated that some receiving OBD control modules may gateway the CDI signal to a dependant secondary OBD control module that reports a fault status to it, based on program-specific serial data architecture and other considerations.

The receiving dependant secondary OBD control module continuously monitors the CDI signal throughout the ignition cycle. When the CDI signal changes from FALSE to TRUE, the receiving dependant secondary OBD control module clears and/or resets all information, which includes, but is not limited to, all fault diagnosis/rate based diagnosis counters and temporary fault codes in memory. This requirement only applies to those DTCs whose status is reported via a Diagnostic Status signal. Upon loss of communication with the transmitting OBD control module, the receiving OBD control module maintains its function as if the CDI signal were set to FALSE The secondary OBD control module associated with the ESD or battery pack (i.e., the BPCM) transmits multiple (e.g. 4) battery pack diagnostic status (BPDS) packet signals. These signals are used to report the status of all DTCs related to the battery pack. Each BPDS packet signal includes two sub-signals to report the status of a plurality of diagnostics (e.g., 32) of those diagnostics that are supported and those that are not by periodically cycling all diagnostic indices. For example, if the secondary ODB control module only actually supports some subset of diagnostics of the total possible diagnostics, the BPDS packet signal for all unsupported diagnostics have a not supported status.

Upon power up, the first BPDS packet signal includes diagnostic information for the first diagnostic index (e.g., diagnostic index=0). If more than 32 diagnostic indices are being reported the second BPDS packet signal includes diagnostic information for the 33rd diagnostic (e.g., diagnostic index=0), and so on. After transmitting the last diagnostic (e.g., diagnostic index=31) the process for each BPDS packet signal starts over by sending a frame for the 1st diagnostic. As a result of delays between fault detection and notification to the receiving primary OBD control module (i.e., the HCP), the receiving primary OBD control module cannot use these messages nor the DTCs stored within the receiving primary OBD control module to activate default modes of operation. Default modes that require faster notification must use validity flags or some other mechanism directly associated with the corresponding input data being used. The primary purpose of the BPDS packet signal is to enable DTC storage within the receiving primary OBD control module without requiring the transmitting secondary OBD control module to bear the burden of diagnostic infrastructure software. The reported DTC index and associated status are incremented or updated as described above at the periodic transmit rate. The DTC index and associated status are not incremented or updated faster than the periodic transmit rate so no DTC index and associated status is lost.

The BPDS packet signals include the DTC index and the DTC status. The DTC index is used as an index to a table of supported DTCs and indicates the particular DTC whose status is indicated in the DTC status. The DTC status includes the diagnostic test status of the DTC indicated in the DTC index.

At power-up the diagnostic test status for each non-supported DTC is initialized to NOT SUPPORTED, and the diagnostic test status for each supported DTC is initialized to NO STATUS TO REPORT, until the diagnostic test is disabled or completes a PASS/FAIL decision. If a diagnostic test becomes critically disabled, the reported status remains in the critically disabled state until the disabling conditions no longer exists, at which time the diagnostic test is re-initialized to the power-up values. After a PASS or FAIL status is reported, the diagnostic status is re-initialized to the power-up values until another PASS/FAIL decision is made. This is required because the primary OBD control module provides the diagnostic status for each DTC to service technicians via a 1 byte DTC status signal so that the service tool can directly display the real time status. After a code clear in the primary OBD control module, the primary OBD control module discards any received diagnostic status and ceases reporting to the diagnostic data manager for a threshold time (e.g., 2-3 seconds).

The secondary OBD control module is responsible for determining when the DTC status is DIGNOSTIC PASSED or DIAGNOSTIC FAILED for each diagnostic. A DTC status of CRITICALLY DISABLED indicates that a diagnostic test is disabled in such a manner that there is no way for the driver to operate the vehicle for the remainder of the standard OBD driving cycle and make the diagnostic test run.

The associated primary OBD control module receives the plurality of BPDS packet signals, which are used by the primary OBD control module to store faults and report a PASS/FAIL for the DTC. As a result of delays between fault detection and notification to the primary OBD control module, the primary OBD control module cannot use these messages nor the DTCs stored within the primary OBD control module to activate default modes of operation. Default modes that require quicker notification must use validity flags associated with the corresponding battery pack data being used.

The primary purpose of the BPDS packet signals is to enable DTC storage within the primary OBD control module without requiring the associated secondary OBD control module to bear the burden of compliance related OBD infrastructure software. It is also anticipated that the BPDS packet signals can also used for communicating the status of non-OBD faults.

The dependent secondary OBD control modules associated with the TPIM (i.e., the MCPA and MCPB) transmit motor control system A/B diagnostic status (MCSDS) packet signals to the associated primary OBD control module (i.e., the HCP). The MCSDS packet signals are used to report the status of all DTCs related to the transmitting dependent secondary OBD control modules. The dependent secondary OBD control modules use the MCSDS packet signals to report the status of multiple diagnostics (e.g. 32) including those that are supported and those that are not, by periodically cycling all of the diagnostic indices. For example, if the dependent secondary OBD control modules only actually support some subset of the total diagnostics, the MCSDS packet signal for all unsupported diagnostics would be sent with a status equal to NOT SUPPORTED.

Upon power up, the first MCSDS packet signal includes the diagnostic information for the first diagnostic (e.g., diagnostic index=0). If more than 32 diagnostic indices are being reported, the second MCSDS packet signal includes the diagnostic information for the 33rd diagnostic (e.g., diagnostic index=0), and so on. After transmitting the last diagnostic (e.g., diagnostic index=31), the process for each MCSDS packet signal starts over by sending a frame for the first diagnostic. As a result of delays between fault detection and notification to the receiving primary OBD control module, the receiving primary control module cannot use these messages nor the DTCs stored within the primary OBD control module to activate default modes of operation. Default modes that require faster notification must use validity flags or some other mechanism directly associated with the corresponding input data being used. The primary purpose of the MCSDS packet signals is to provide DTC storage within the primary OBD control module without the transmitting secondary dependent OBD control modules requiring diagnostic infrastructure software. The reported DTC index and associated status are incremented or updated as described above at the periodic transmit rate. The DTC index and associated status are not incremented or updated faster than the periodic transmit rate such that no DTC index value and associated status is lost.

The DTC index is used as an index to the table of supported DTCs and indicates the particular DTC whose status is provided by the DTC status signal. The DTC status provides the diagnostic test status of the DTC indicated by the DTC index signal. At power-up, the diagnostic test status for each non-supported DTC is initialized to NOT SUPPORTED, and the diagnostic test status for each supported DTC is initialized to NO STATUS TO REPORT, until the diagnostic test is disabled or completes a PASS/FAIL decision.

If a diagnostic test becomes critically disabled, the reported status remains in the critically disabled state until the disabling conditions no longer exist, at which time the diagnostic test is re-initialized to the power-up values. After a PASS or FAIL status is reported, the diagnostic status is re-initialized to the power-up values until another PASS/FAIL decision is made. This is required because the receiving primary OBD control module provides the diagnostic status for each DTC to service technicians via the service tool to directly display the real time status. After a code clear in the primary OBD control module, the primary control module discards any received diagnostic status and ceases reporting to the diagnostic data manager for a threshold time (e.g., 2-3 seconds). The dependent secondary OBD control modules are responsible for determining when the DTC status should be Diagnostic Passed or Diagnostic Failed for each diagnostic. A DTC status of Critically Disabled indicates when a diagnostic test is disabled in a manner such that there is no way for the driver to operate the vehicle for the remainder of the standard OBD driving cycle and make the diagnostic test run.

The MCSDS packet signals are received by the associated primary OBD control module, which uses the MCSDS packet signals to store faults and report a PASS/FAIL for the DTC. As a result of delays between fault detection and notification to the primary OBD control module, the pimary OBD control module cannot use these messages nor the DTCs stored within the primary OBD control module to activate default modes of operation. Default modes which require quicker notification must use validity flags associated with the corresponding data being used. The primary purpose of the MCSDS packet signals is to enable DTC storage within the primary OBD control module without the dependent secondary OBD control modules requiring compliance related OBD infrastructure software. It is also anticipated that the MCSDS packet signals can also communicate the status of non-OBD faults.

The control module calibration identification information (CMCII) packet signal is used to transfer the calibration identification (CID) and the calibration verification number (CVN) data from a primary, secondary and/or dependent secondary OBD control module to its host OBD control module. All software and calibration data stored in the particular OBD control module is included in one or more CIDs and associated CVNs.

A calibration identification index (CII) is provided and is a rolling index that enables up to 16 CIDs and associated CVNs to be transmitted. A contiguous set of indexes starting from index 0 is used for all of the CIDs supported by the particular OBD control module. The CII remains constant until all associated frames of a CID and CVN are transmitted (e.g., three transmissions of each index prior to an index change).

A data status (DS) is provided and indicates the status of the data currently being transmitted. The DS has three states; CII Not Used, CVN Not Calculated and Not CVN Calculated. The CII Not Used DS state indicates that the index being transmitted does not contain CID or CVN information. The CVN Uncalculated DS state indicates that the CVN has not been calculated during this ignition cycle while CID information is being transmitted for the CII. The CVN Calculated DS status indicates that the CID and the CVN calculated this ignition cycle are being transmitted for the current CII. A sequence number (SN) is provided and cycles from zero to two for each CII. The SN indicates the frame of data being transmitted and enables the receiving OBD control module to correctly combine the twenty bytes of data for each CII.

The receiving OBD control module uses the CII and the SN to reconstruct the CID and CVN data and associate it with its data status. The receiving OBD control module also provides 20 bytes of either ignition-independent or battery independent memory for storage of each received CID and CVN, and also provides memory to store the storage status of each CID and CVN. In this manner, the receiving OBD control module distinguishes between CII that are not used, that have part numbers that have not been received, that have CVNs that are uncalculated, or that have part numbers and CVNs that have been received and stored. The receiving OBD control module stores the last received CIDs and associated CVNs, as well as the receive status of each CII. If a new CID is received with the CVN uncalculated, the CID is stored and marked as a CID with an uncalculated CVN until a calculated CVN is received.

Data is only processed and stored if the 3 frames that make up a CII are received as 3 contiguous frames. This data is reported with the receiving OBD control module's own vehicle information type data (i.e., mode $09) when such a response is provided. Data from the CIIs with a DS of CII Not Used are not included in the reported vehicle information type data.

The distributed diagnostic architecture of the present invention distributes OBD functionality in a control system that includes multiple systems with corresponding control modules. More specifically, the distributed diagnostic architecture provides a common means for a vehicle to coordinate diagnostics and related information between a plurality of vehicle control modules, assures compliance with government regulations and provides for vehicle serviceability with such complex systems. Also, the number of control modules with regulated OBD device IDs can be reduced without reducing the number of OBD control modules for a given application.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A distributed on-board diagnostic (OBD) architecture for a control system of a vehicle, comprising:
a plurality of control modules that are in communication with one another; and
a designated master OBD control module that is one of said plurality of control modules, wherein said master OBD control module executes functions that a remainder of said plurality of control modules are not configured to execute including arbitrating and storing OBD freeze frame data and determining OBD status flags of said remainder of said plurality of control modules.

2. The distributed OBD architecture of claim 1 wherein each control module of said plurality of control modules executes an OBD algorithm to monitor whether at least one of an input, an output and a system associated with said each control module is functioning properly.

3. The distributed OBD architecture of claim 2 wherein each of said plurality of control modules executes a self-diagnosis.

4. The distributed OBD architecture of claim 3 wherein said self-diagnosis includes a check of at least one of ROM, RAM, other memory devices and other emissions related peripheral devices.

5. The distributed OBD architecture of claim 1 further comprising a designated primary OBD control module that is one of said plurality of control modules, wherein each of said master OBD control module and said primary OBD control module stores at least one diagnostic trouble code (DTC) corresponding to one of said remainder of said plurality of control modules that is associated with one of said master OBD control module and said primary OBD control module, as well as storing their own DTCs.

6. The distributed OBD architecture of claim 5 wherein each of said plurality of control modules increments a rate-based diagnostic monitor if one is associated therewith.

7. The distributed OBD architecture of claim 6 wherein each of said master OBD control module and said primary OBD control module stores at least one rate-based monitor value corresponding to one of said remainder of said plurality of control modules that is associated with one of said master OBD control module and said primary OBD control module, as well as storing their own rate-based monitor values.

8. The distributed OBD architecture of claim 6 wherein each of said master OBD control module and said primary control module gateway OBD signals between a first communications bus and a second communications bus.

9. The distributed OBD architecture of claim 5 wherein each of said master OBD control module and said primary control module stores and reports calibration identification and calibration verification number information of at least one of said remainder of said plurality of control modules associated with one of said master OBD control module and said primary OBD control module.

10. The distributed OBD architecture of claim 5 wherein said primary OBD control module provides said master OBD control module With signals including at least one of an emissions related DTC signal and an emissions related malfunction active signal.

11. The distributed OBD architecture of claim 7 further comprising a designated secondary control module of said plurality of control modules, wherein said secondary control module provides associated rate-based monitor information to one of said master OBD control module and said primary OBD control module.

12. The distributed OBD architecture of claim 11 further comprising a designated dependent secondary OBD control module of said plurality of control modules that executes at least one of clearing diagnostic information based only on direction of one of said master OBD control module and said primary OBD control module, and providing calibration identification and calibration verification number information to an associated host control module.

13. A method of distributing on-board diagnostic (OBD) functions in a control system of a vehicle comprising:
interconnecting a plurality of control modules for communication with one another;
designating one of said plurality of control modules as an OBD master control module; and
executing functions using said OBD master control module that a remainder of said plurality of control modules are not configured to execute including arbitrating and storing OBD freeze frame data and determining OBD status flags of said remainder of said plurality of control modules.

14. The method of claim 13 wherein each control module of said plurality of control modules executes an OBD algorithm to monitor whether at least one of an input, an output and a system associated with said each control module is functioning properly.

15. The method of claim 14 further comprising executing a self-diagnosis for each of said plurality of control modules.

16. The method of claim 15 wherein said self-diagnosis includes a check of at least one of ROM, RAM, other memory devices and other emissions related peripheral devices.

17. The method of claim 13 further comprising designating one of said plurality of control modules as a primary OBD control module, wherein each of said master OBD control module and said primary OBD control module stores at least one diagnostic trouble code (DTC) corresponding to one of said remainder of said plurality of control modules that is associated with one of said master OBD control module and said primary OBD control module, as well as storing their own DTCs.

18. The method of claim 17 wherein each of said plurality of control modules increments a rate-based diagnostic monitor if one is associated therewith.

19. The method of claim 18 wherein each of said master OBD control module and said primary OBD control module stores at least one rate-based monitor value corresponding to one of said remainder of said plurality of control modules that is associated with one of said master OBD control module and said primary OBD control module, as well as storing their own rate-based monitor values.

20. The method of claim 17 wherein each of said master OBD control module and said primary control module gateway OBD signals between a first communications bus and a second communications bus.

21. The method of claim 17 wherein each of said master OBD control module and said primary control module stores and reports calibration identification and calibration verification number information of at least one of said remainder of said plurality of control modules associated with one of said master OBD control module and said primary OBD control module.

22. The method of claim 17 wherein said primary OBD control module provides said master OBD control module with signals including at least one of an emissions related DTC signal and an emissions related malfunction active signal.

23. The method of claim 19 further comprising designating one of said plurality of control modules as a secondary control module, wherein said secondary control module provides associated rate-based monitor information to one of said master OBD control module and said primary OBD control module.

24. The method of claim 23 further comprising designating one of said plurality of control modules as a dependent secondary OBD control module that executes at least one of clearing diagnostic information based only on direction of one of said master OBD control module and said primary OBD control module, and providing calibration identification and calibration verification number information to an associated host control module.

25. A distributed on-board diagnostic (OBD) architecture for a control system of a vehicle, comprising:
 a first plurality of control modules that are in communication with one another via a first communications bus;
 a second plurality of control modules that are in communication with one another via a second communications bus; and
 a designated master OBD control module that is one of said first and second pluralities of control modules, wherein said master OBD control module executes functions that a remainder of said first and second pluralities of control modules are not configured to execute including arbitrating and storing OBD freeze frame data and determining OBD status flags of said remainder of said first and second pluralities of control modules.

26. The distributed OBD architecture of claim 25 wherein each control module of said first and second pluralities of control modules executes an OBD algorithm to monitor whether at least one of an input, an output and a system associated with said each control module is functioning properly.

27. The distributed OBD architecture of claim 26 wherein each of said first and second pluralities of control modules executes a self-diagnosis.

28. The distributed OBD architecture of claim 27 wherein said self-diagnosis includes a check of at least one of ROM, RAM, other memory devices and other emissions related peripheral devices.

29. The distributed OBD architecture of claim 25 further comprising a designated primary OBD control module that is one of said first and second pluralities of control modules.

30. The distributed OBD architecture of claim 29 wherein each of said master OBD control module and said primary OBD control module stores at least one diagnostic trouble code (DTC) corresponding to one of said remainder of said first and second pluralities of control modules that is associated with one of said master OBD control module and said primary OBD control module, as well as storing their own DTCs.

31. The distributed OBD architecture of claim 30 wherein each of said first and second pluralities of control modules increments a rate-based diagnostic monitor if one is associated therewith.

32. The distributed OBD architecture of claim 31 wherein each of said master OBD control module and said primary OBD control module stores at least one rate-based monitor value corresponding to one of said remainder of said first and second pluralities of control modules that is associated with one of said master OBD control module and said primary OBD control module, as well as storing their own rate-based monitor values.

33. The distributed OBD architecture of claim 30 wherein each of said master OBD control module and said primary control module gateway OBD signals between said first communications bus and said second communications bus.

34. The distributed OBD architecture of claim 30 wherein each of said master OBD control module and said primary control module stores and reports calibration identification and calibration verification number information of at least one of said remainder of said first and second pluralities of control modules associated with one of said master OBD control module and said primary OBD control module.

35. The distributed OBD architecture of claim 30 wherein said primary OBD control module provides said master OBD control module with signals including at least one of an emissions related DTC signal and an emissions related malfunction active signal.

36. The distributed OBD architecture of claim 32 further comprising a designated secondary control module of said first and second pluralities of control modules wherein said secondary control module provides associated rate-based monitor information to one of said master OBD control module and said primary OBD control module.

37. The distributed OBD architecture of claim 36 further comprising a designated dependent secondary OBD control module of said first and second pluralities of control modules that executes at least one of clearing diagnostic information based only on direction of one of said master OBD control module and said primary OBD control module, and providing calibration identification and calibration verification number information to an associated host control module.

38. The distributed OBD architecture of claim 1, wherein said functions further include arbitrating a malfunction indicator lamp (MIL) state.

39. The method of claim 13, wherein said functions further include arbitrating a malfunction indicator lamp (MIL) state.

40. The distributed OBD architecture of claim 25, wherein said functions further include at least one of arbitrating a malfunction indicator lamp (MIL) state.

* * * * *